United States Patent
Ianev et al.

(10) Patent No.: US 9,955,283 B2
(45) Date of Patent: Apr. 24, 2018

(54) COMMUNICATION SYSTEM

(75) Inventors: Iskren Ianev, Berkshire (GB); Yannick Lair, Berkshire (GB)

(73) Assignee: NEC CORPORATION, Tokyo (JP)

( * ) Notice: Subject to any disclaimer, the term of this patent is extended or adjusted under 35 U.S.C. 154(b) by 157 days.

(21) Appl. No.: 13/984,452

(22) PCT Filed: Feb. 7, 2012

(86) PCT No.: PCT/JP2012/053204
§ 371 (c)(1),
(2), (4) Date: Aug. 8, 2013

(87) PCT Pub. No.: WO2012/108544
PCT Pub. Date: Aug. 16, 2012

(65) Prior Publication Data
US 2013/0324123 A1    Dec. 5, 2013

(30) Foreign Application Priority Data
Feb. 10, 2011 (GB) .................................. 1102389.2

(51) Int. Cl.
*H04W 60/00* (2009.01)
*H04W 4/00* (2018.01)
(Continued)

(52) U.S. Cl.
CPC ........... *H04W 4/005* (2013.01); *H04W 4/021* (2013.01); *H04W 60/00* (2013.01); *H04W 64/00* (2013.01); *H04W 68/005* (2013.01)

(58) Field of Classification Search
CPC ... H04W 4/005; H04W 60/00; H04W 68/005; H04W 64/00
(Continued)

(56) References Cited

U.S. PATENT DOCUMENTS 8,755,825 B2 *   6/2014   Pinheiro et al. .............. 455/458

FOREIGN PATENT DOCUMENTS

| CN | 101233543 A | 7/2008 |
|---|---|---|
| JP | 2003189365 A | 7/2003 |
| WO | 2010130029 A1 | 11/2010 |

OTHER PUBLICATIONS

3rd Generation Partnership Project, Technical Specification Group Service and System Aspects, "Service requirements for Machine-Type Communications", MTC, Stage 1 (Release 11), Dec. 2010, 23 pages total.

(Continued)

*Primary Examiner* — Lester Kincaid
*Assistant Examiner* — Gary Lafontant
(74) *Attorney, Agent, or Firm* — Sughrue Mion, PLLC

(57) ABSTRACT

A communication system for supporting machine type communication within a cellular communication network is described in which a communication device is allocated a permanent offline area in which the communication device is expected to be located whilst not attached for communication within the network. The communication device identifies a cell in which the communication device is currently located and determines whether or not the cell forms part of the permanent offline area or a temporary offline area that comprises a previously visited cell that is not part of the permanent offline area. If these areas do not comprise the cell in which the communication device is currently located, the communication device attaches to the network and communicates information identifying the cell in which the communication device is currently located to the network.

33 Claims, 6 Drawing Sheets

(51) Int. Cl.
    *H04W 4/02*     (2018.01)
    *H04W 64/00*    (2009.01)
    *H04W 68/00*    (2009.01)
(58) Field of Classification Search
    USPC ..................................................... 455/435.1
    See application file for complete search history.

(56) References Cited

OTHER PUBLICATIONS

3rd Generation Partnership Project, Technical Specification Group Core Network and Terminals, Technical realization of Cell Broadcast Service (CBS) (Release 11), Dec. 2010, 48 pages total.

KPN, "Optimisation for low mobility", 3GPP TSG-SAI #46, May 11 to 15, 2008, S1-091218 (revision of S1-091010), 3 pages total, Japan.

LG Electronics Inc., "PWS-like Broadcast for MTC", 3GPP TSG-RAN WG2 #70, May 10 to 14, 2010, R2-102947, 2 pages total, Canada.

Huawei, Network Improvement for Low Mobility, 3GPP TSG SA WG2 Meeting #76, Nov. 16 to 20, 2009, S2-096672, 3 pages total, Cabo.

International Search Report dated Mar. 6, 2012, issued by the International Searching Authority in corresponding International Application No. PCT/JP2012/053204.

Written Opinion dated Mar. 6, 2012, issued by the International Searching Authority in corresponding International Application No. PCT/JP2012/053204.

Communication dated Sep. 22, 2015 from the State Intellectual Property Office of the People's Republic of China in counterpart application No. 201280008007.7.

"3GPP TSG SA WG2 Meeting #77 TDS2-100096", Kpn et al., p. 1-3, 3GPP, 201001, Jan. 22, 2010.

"3GPP TSG SA WG2 Meeting #83 TD S2-110412", pp. 1-2, NEC, Feb. 25, 2011.

Communication dated May 29, 2017, issued from the Europe Patent Office in corresponding European Patent Application No. 12744372.9.

3rd Generation Partnership Project; Technical Specification Group Services and System Aspects; System Improvements for Machine-Type Communications; Technical Report, Valbonne, France, (Release 10), 3GPP TR 23.888 V1.0.0 (Jul. 2010); Sep. 22, 2010, 80 pages total.

Huawei, "Paging optimization according to the classification of UE mobility", 3GPP TSG SA WG2 Architecture-S2 #50, Jan. 16 to 20, 2006, S2-060210, 3 pages total.

* cited by examiner

COMMUNICATION SYSTEM

CROSS REFERENCE TO RELATED APPLICATIONS

This application is a National Stage of International Application No. PCT/JP2012/053204 filed Feb. 7, 2012, claiming priority based on British Patent Application No. 1102389.2 filed Feb. 10, 2011, the contents of all of which are incorporated herein by reference in their entirety.

TECHNICAL FIELD

The present invention relates to a communication system that supports machine type communication. In particular, the invention concerns improvements related to, but not limited to, a communication system that supports machine type communication as defined in the 3GPP standards, like TS 22.368.

BACKGROUND ART

Machine type communication (MTC), sometimes referred to as machine to machine (M2M) communication, is a form of data communication that involves one or more electronic entities (MTC devices) without necessarily requiring human interaction. MTC devices are mobile terminals (User Equipment (UE)) configured for MTC and they come in many forms in order to serve many different MTC applications and provide many different MTC services.

Generally, a service optimized for MTC differs from a service optimized for Human to Human (H2H) communications. Specifically, MTC is different to current mobile network communication services as it involves a different set of considerations to H2H mobile communications including, for example: different market scenarios, data communications, lower costs and effort, and potentially a very large number of communicating terminals with, to a large extent, little traffic per terminal.

Some examples of the types of applications and service types that MTC may be used to provide are listed in Table 1. The list in Table 1 is not exhaustive, and is provided as an indication of the wide potential application of MTC to provide an extensive and diverse range of MTC services.

TABLE 1

| Service Type | MTC Applications |
| --- | --- |
| Security | Surveillance systems |
| | Backup for landline |
| | Control of physical access (e.g. to buildings) |
| | Car/drive security |
| Tracking & Tracing | Fleet Management |
| | Order Management |
| | Pay as you drive |
| | Asset Tracking |
| | Navigation |
| | Traffic information |
| | Road tolling |
| | Road traffic optimization/steering |
| Payment | Point of sales |
| | Vending machines |
| | Gaming machines |
| Health | Monitoring vital signs |
| | Supporting the aged or handicapped |
| | Web access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

One of the current requirements of MTC, defined in the relevant 3GPP standards (TS22.368), is the ability to send a so called 'MTC device trigger' from an MTC server to an MTC device, by which the network can trigger the MTC device to initiate communication with the MTC server. This MTC device trigger provides for a polling model which supports the many M2M applications for which polling from the MTC server to MTC devices is desirable. For example, polling is desirable for applications in which an MTC user wants to be in control of communication from MTC devices and/or does not want MTC devices to be able to access the MTC server arbitrarily. Further, even for applications where the MTC devices are allowed to initiate communications without being triggered by the server, there may still be a need for the MTC server to poll the MTC devices, for example, to interrogate them as part of a maintenance procedure.

A communication network supporting MTC must therefore be able to trigger MTC devices to initiate communication with an MTC server based on a trigger indication from the MTC server. Thus, an MTC device must be able to receive the trigger indication from the network, and be able to establish communication with the MTC server when the trigger indication has been received. In accordance with this, there are a number of different communication scenarios in which the MTC device may be required to receive a trigger indication including, for example: when the MTC device is offline (detached from the network); when the MTC device is online (attached to the network for signaling or user plane data), but has no data connection established; and/or when the MTC device is online and has a data connection established.

In order to provide for receipt of trigger indications when the MTC device is offline (i.e. detached), an MTC device should be able to listen for trigger indications even though it is not attached to the network, for example on a broadcast or on a paging channel. However, with non-attached MTC devices, the network has no definitive knowledge of the location of an MTC device (which may have moved since it last connected) and, accordingly, does not know in which cell (or group of cells) to broadcast the trigger message to ensure that the MTC device receives it.

One potential solution to this problem is for an MTC user (who does have knowledge about the location of the MTC device) to provide a Public Land Mobile Network (PLMN) with the necessary information on the location of the MTC device. Accordingly, based on the information provided to it by the MTC user, the PLMN can then broadcast a trigger indication in a relevant cell or group of cells. The MTC device, while not attached, may thus listen to the broadcast channel of the PLMN in order to ensure that any trigger indication is received.

The trigger indications may be broadcast using a Cell Broadcast Service (CBS) (e.g. as specified in 3GPP standard TS23.041) in which one or more Cell Broadcast Entities (CBEs) are connected into a radio network via a Cell Broadcast Center (CBC) that is under control of a mobile network operator. The mobile network operator may make an interface of the CBC available to a trusted 3rd party to interconnect their own CBE to the CBC of the mobile network operator. The MTC Devices are assigned a Unique Paging Identity (UPID) and are programmed to monitor a predetermined set of CB channel(s), even when they are not attached to the network. Accordingly, the MTC Server of the 3rd party is able to send CBS messages including one or more DPIDs, to specific MTC devices via the 3rd party CBE, in particular areas based on location information made available to the MTC server by the MTC user. The MTC trigger may also be broadcast in system information.

This method of broadcasting the MTC trigger within system information, or using a CBS, requires that the PLMN be provided with new location information, by the MTC user, for each move of the MTC device to an area for which there is a change to the cell (or group of cells) in which the trigger indication should be broadcast. This is a workable solution as long as the MTC user is able to provide the PLMN with the MTC device location information when required, and so is best suited to applications in which the MTC device does not move, or only moves very rarely (for example, gas and electricity smart meters).

Many MTC devices move only rarely (e.g. gas or electricity meters, when the owner of the meter moves house) and so new location information may be provided to the PLMN, by the MTC user, relatively easily. However, there are MTC applications (e.g. mobile vending machines) for which the corresponding MTC devices remain offline for long periods but move with such regularity that provision of the new location information to the PLMN, by the MTC user, becomes impractical or even impossible. In such scenarios, the MTC User may not even have an up to date location for the MTC device. Similarly, there are many other type of MTC Devices that may move, whilst offline, and for which upto date location information cannot be provided by the MTC user (for example, home based MTC Devices that move when the owner of the MTC device travels). Since these MTC Devices are offline (not attached) and the PLMN has no information about their location, the MTC devices cannot be sent a trigger indication by the MTC server unless the PLMN broadcasts the MTC device trigger indication in all of the cells of the PLMN to make sure that the MTC device is guaranteed to receive the trigger indication. However, broadcasting in all cells is impractical as it would be very inefficient, and may even be technically impossible.

DISCLOSURE OF INVENTION

Accordingly, there is a need for an improved communication system that supports machine type communication and which solves, or at least alleviates, the above issues.

According to one aspect of the invention there is provided a communication device for supporting machine type communication within a cellular communication network, the communication device comprising: means for obtaining expected location information representing at least one area in which the communication device is expected to be located whilst not attached for communication within the network; means for identifying a cell in which the communication device is currently located; and means for determining, from the expected location information, whether or not the cell forms at least part of the at least one area, wherein: if the at least one area is determined, by the determining means, not to comprise the cell in which the communication device is currently located, the communication device is operable to attach to the network, and communicate information identifying the cell in which the communication device is currently located to the network.

The expected location information may represent: a first (e.g. predefined) area comprising at least one cell in which the communication device may be expected to be located whilst not attached for communication within the network; and may represent a second (e.g. dynamically defined) area comprising at least one further cell. The second area may comprise at least one cell for which the communication device has previously communicated cell identification information in response to a determination that the at least one area does not comprise that cell.

If the at least one area is determined not to comprise the cell in which the communication device is currently located, the communication device may be further operable to update the information representing the second area to comprise the cell in which the communication device is currently located.

The communication device may be operable to update the information representing the second area by replacing another cell forming at least part of the second area with the cell in which the communication device is currently located.

The second area may comprise a single cell.

The communication device may be operable to update the information representing the second area by replacing it with the cell in which the communication device is currently located or by adding the cell to at least one cell already forming at least part of the second area.

The communication device may be further operable to update the information representing the second area based on information received from the communication network. The information received from the communication network may comprise information identifying at least one of the following: a cell neighboring the cell in which the communication device is currently located; a local area (LA) associated with the cell in which the communication device is currently located or at least one cell thereof; a routing area (RA) associated with the cell in which the communication device is currently located or at least one cell thereof; and/or a tracking area (TA) associated with the cell in which the communication device is currently located or at least one cell thereof.

The communication device may further comprise: means for receiving, whilst not attached to the communication network, a trigger message for triggering the communication device to initiate communications with a further communication device; and may comprise means for responding to receipt of the trigger message by initiating the communications.

The determining means may be operable to determine whether or not the at least one area comprises a cell in which the communication device is currently located after expiry of a predefined time period. The predefined time period may be monitored by means of a timer or counter on the communication device.

The communication device may be operable to detach from the network automatically after communicating, to the network, the information identifying the cell in which the communication device is currently located.

The identifying means may be operable to identify a change of cell in which the communication device is currently located, and the determining means may be operable to determine whether or not the at least one area comprises the cell in which the communication device is currently located on identifying a change of cell in which the communication device is currently located.

The communication device may be operable to detach from the communication network on receipt of a message from the communication network indicating that the detach should take place. The message from the communication network may be received after a predefined time period (e.g. monitored by means of a timer or counter). The predefined time period may be represented as a predefined number of periodic updates.

According to one aspect of the invention there is provided a method performed by a communication device of supporting machine type communication within a cellular communication network, the method comprising: obtaining expected location information representing at least one area in which the communication device is expected to be located whilst not attached for communication within the network; identifying a cell in which the communication device is currently located; and determining, from the expected location information, whether or not the cell forms at least part of the at least one area, wherein if the at least one area is determined not to comprise the cell in which the communication device is currently located, the method comprises attaching to the network, and communicating information identifying the cell in which the communication device is currently located to the network.

According to one aspect of the invention there is provided a network entity for supporting machine type communication by a communication device within a cellular communication network, the network entity comprising: means for receiving a message for the communication device from a server; means for identifying at least one area comprising at least one cell in which the communication device is expected to be located whilst not attached for communication within the network; and means for broadcasting the message in each cell of the at least one area so identified.

According to one aspect of the invention there is provided a network entity for supporting machine type communication by a communication device within a cellular communication network, the network entity comprising: means for storing expected location information representing at least one area in which the communication device is expected to be located whilst not attached for communication within the network; means for receiving, from a communication device, information identifying a cell in which the communication device is currently located, which cell does not form part of the at least one area; and means for updating the stored information identifying the at least one area, based on the information received from the communication device, to include the cell in which the communication device is currently located.

The at least one area may comprise: a first, predefined, area comprising at least one cell in which the communication device may be expected to be located whilst not attached for communication within the network; and a second, dynamically defined, area comprising at least one further cell. The second area may comprise at least one cell for which the communication device has previously communicated cell identification information in response to a determination that the at least one area does not comprise that cell.

The updating means may be operable to update the information representing the second area to comprise the cell in which the communication device is currently located. The updating means may be operable to update the information representing the second area by replacing another cell forming at least part of the second area with the cell in which the communication device is currently located. The second area may comprise a single cell.

The updating means may be operable to update the information representing the second area by adding the cell in which the communication device is currently located, to at least one cell already forming at least part of the second area.

The network entity may be operable, in response to receiving the information from the communication device, to allocate at least one further cell to the second area in addition to the cell in which the communication device is currently located, and to notify the communication device of each allocated cell.

The network entity may be operable to initiate detachment of the communication device from the communication network after expiry of a predefined time period for staying on-line.

Detachment of the communication device from the communication network may be initiated by transmission of a message to the communication device to indicate that the detach should take place.

The network entity may be operable, when allocating the at least one further cell, to allocate: a cell neighboring the cell in which the communication device is currently located; a local area (LA) associated with the cell in which the communication device is currently located or at least one cell thereof; a routing area (RA) associated with the cell in which the communication device is currently located or at least one cell thereof; and/or a tracking area (TA) associated with the cell in which the communication device is currently located or at least one cell thereof.

According to one aspect of the invention there is provided a method performed by a network entity for supporting machine type communication by a communication device within a cellular communication network, the method comprising: receiving a message for the communication device from a server; identifying at least one area comprising at least one cell in which the communication device is expected to be located whilst not attached for communication within the network; and broadcasting the message in each cell of the at least one area so identified.

According to one aspect of the invention there is provided a method performed by a network entity for supporting machine type communication by a communication device within a cellular communication network, the method comprising: storing expected location information representing at least one area in which the communication device is expected to be located whilst not attached for communication within the network; receiving, from a communication device, information identifying a cell in which the communication device is currently located, which cell does not form part of the at least one area; and updating the stored information identifying the at least one area, based on the information received from the communication device, to include the cell in which the communication device is currently located.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

The description of the invention with reference to the drawings is by way of example only.

The text of the abstract filed herewith is repeated here as part of the specification. In an exemplary embodiment there is provided a communication system for supporting machine type communication within a cellular communication network is described in which a communication device is allocated a permanent offline area in which the communication device is expected to be located whilst not attached for communication within the network. The communication device identifies a cell in which the communication device is currently located and determines whether or not the cell forms part of the permanent offline area or a temporary offline area that comprises a previously visited cell that is not part of the permanent offline area. If these areas do not comprise the cell in which the communication device is currently located, the communication device attaches to the network and communicates information identifying the cell in which the communication device is currently located to the network.

BRIEF DESCRIPTION OF THE DRAWINGS

Embodiments of the invention will now be described, by way of example only, with reference to the attached figures in which.

BEST MODE FOR CARRYING OUT THE INVENTION

Overview

Figure 1:
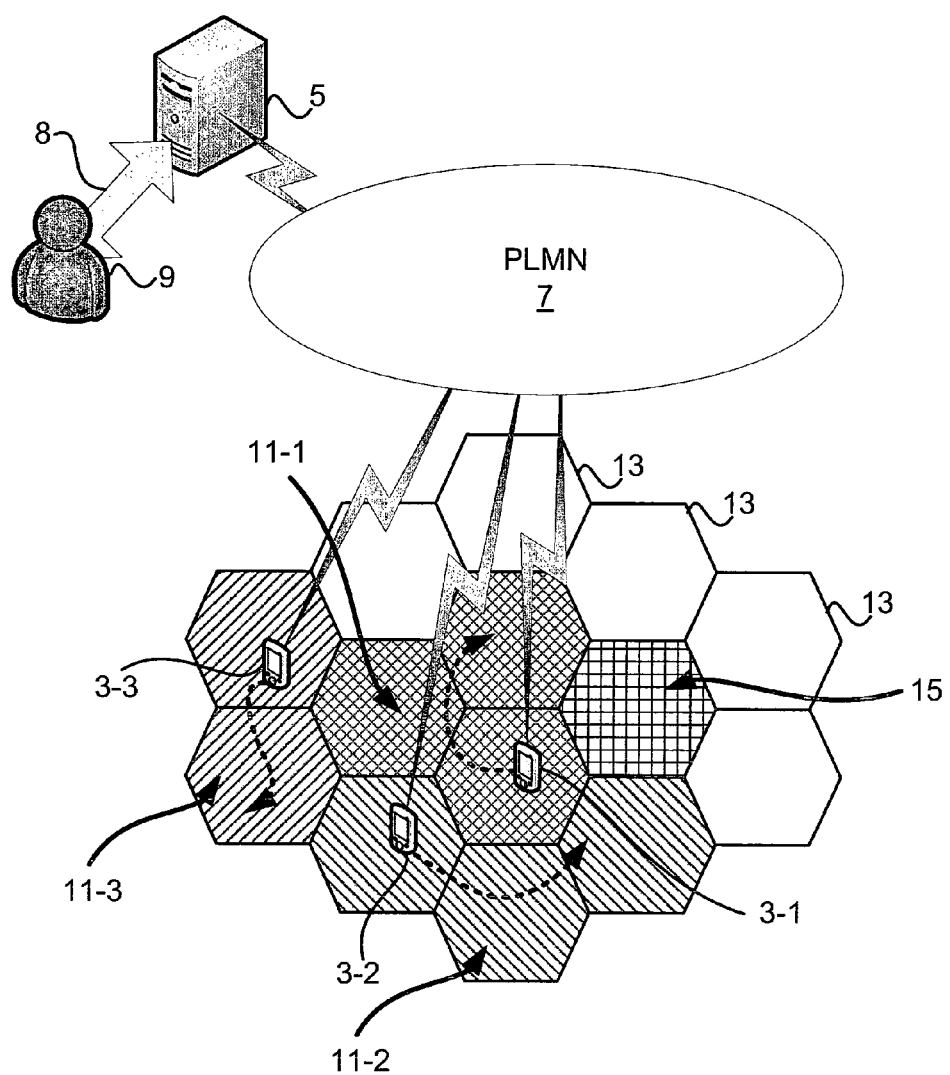
FIG. 1 shows, in simplified overview, a schematic of a communication system.

In FIG. 1 a communication system that supports machine type communication (MTC) is shown in overview generally at 1.

As seen in FIG. 1, the communication system 1 comprises an MTC server 5 which communicates with a Public Land Mobile Network (PLMN) 7, and with a plurality of MTC devices 3-1, 3-2, 3-3 via the PLMN 7. An MTC user 9 is able to access the MTC server 5 via an interface 8. The MTC server 5 performs services for the MTC User 9. Each MTC device 3 comprises user equipment (UE) configured for MTC, and communicates through the PLMN 7 with the MTC server 5 and/or one or more other MTC devices 3.

Each MTC device 3-1, 3-2, 3-3 is allocated a respective designated area 11-1, 11-2, 11-3 comprising at least one cell 13, list of cells 13, Location Area (LA), Routing Area (RA), Tracking Area (TA) and/or combination thereof depending on the type/generation of the network via which the MTC device 3 will connect to the MTC server 5. In FIG. 1 the respective cells 13 of each designated area 11 are highlighted with common hatching. The designated area 11 is referred to herein as a 'Permanent Offline Area' (POA) and represents an area in which the associated MTC device 3 is considered to be likely to reside (or move within as indicated by the dashed arrows) for a relatively large proportion of the time, and in which the MTC device 3 will generally remain offline (unattached to the network). The information identifying the POA 11, in this embodiment, forms part of MTC device subscription information which is defined when the MTC device 3 is set-up as part of a particular MTC service, and can be updated by the MTC server 5 using Non-Access Stratum (NAS) signaling. On receiving the POA update the MTC device 3 deletes the old POA (if any) and saves the new POA Each MTC device 3, and the network 7 (e.g. a network entity such as a mobility management entity (MME), Serving GPRS Support Node (SGSN), or Mobile Switching Centre (MSC)), is provided with a dedicated timer referred to herein as an 'Offline Periodic Update1 timer (or 'OffPer' timer). Unlike existing LA/RA/TA periodic update timers, which are used for online (attached) terminals, the OffPer timer is used for offline (unattached) MTC devices 3. Each MTC device 3 uses its OffPer timer to determine when an offline periodic update of the MTC device's location may be due. Specifically, when the OffPer timer expires, the associated MTC device 3 identifies its current location and compares the identified location with the cell 13 (or cells) forming the POA 11 for that MTC device 3. The MTC device 3 also compares the identified location with a so called Temporary Offline Area (TOA) 15 (when defined). The TOA 15 represents a cell 13, which does not form part of the POA 11, and from which the MTC device 3 has previously updated its off-line location. If the MTC device 3 is offline, and the MTC device 3 is in a cell 13 that is not part of the POA 11 or the TOA 15 (when defined) for that MTC device 3, then the MTC device 3 performs an offline periodic update so that the network 7 and MTC device 3 can set (or update) the TOA 15 to the cell 13 from which the location update is made.

The length of the period represented by the OffPer timer is notified to the MTC device 3 by the network using appropriate Non-Access Stratum (NAS) signaling. The OffPer Timer is unique within the LA/RA/TA.

When a connection between the MTC device 3 and the MTC server 5 is required, the network 7 is able to broadcast (using System Information or a Cell Broadcast service) a trigger message in each cell 13 of the POA 11 and TOA 15 (when defined). The MTC device 3, while not attached (offline), listens to the broadcast channel of the PLMN 7, in the cell 13 in which it resides and, accordingly, will respond to the trigger, as appropriate, by going online.

In this way, therefore, the PLMN 7 can advantageously keep a track of the movement of the offline MTC devices 3, in an efficient manner, thereby allowing them to be accessible by the MTC server 5 at any time (regardless of whether the MTC user 9 for the devices in question has notified the PLMN of the movement).

MTC Device

Figure 2:
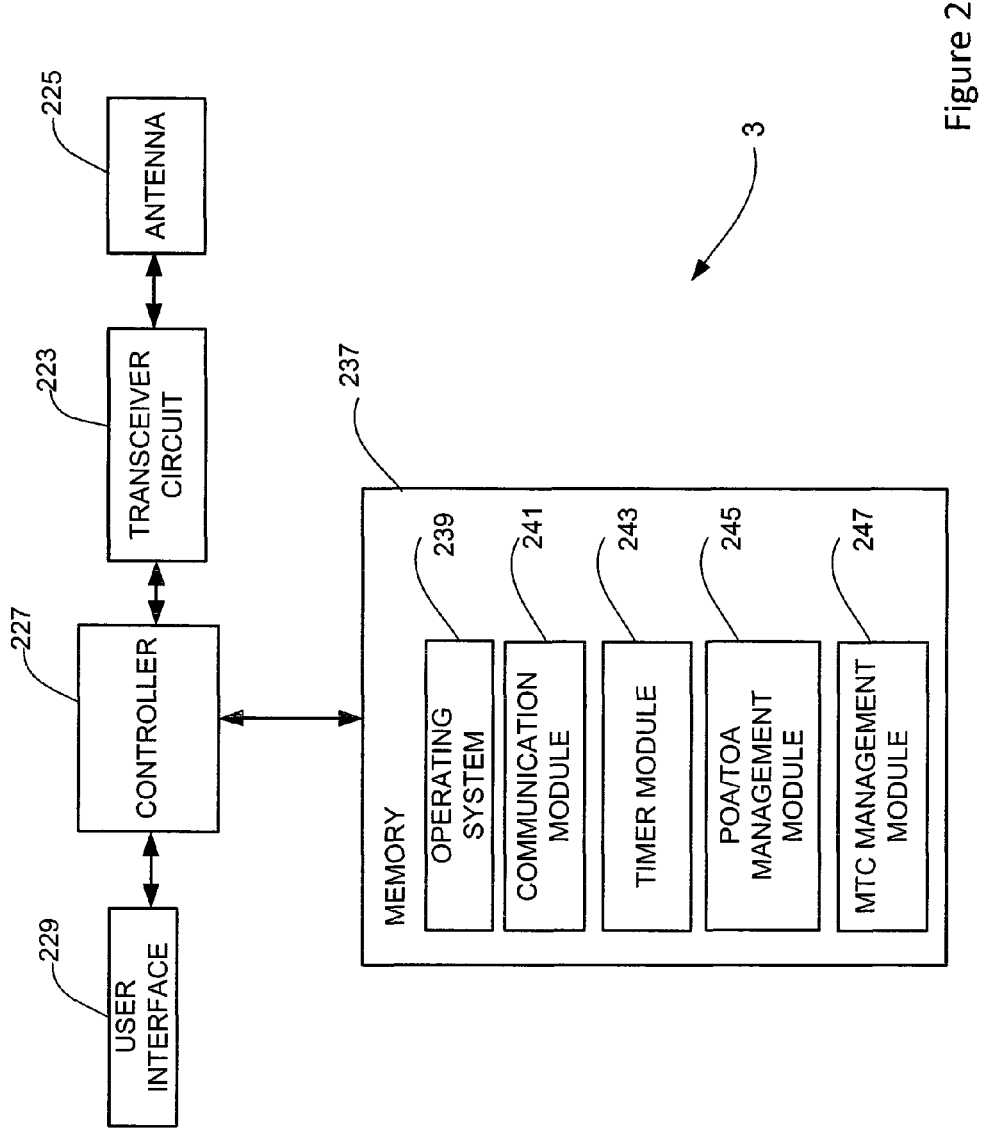
FIG. 2 shows a simplified block diagram of a machine type communication device forming part of the system shown in FIG. 1.

FIG. 2 schematically illustrates the main components of an MTC device 3 (UE) of FIG. 1. As shown, the MTC device 3 comprises a mobile station 3 including transceiver circuitry 223 which is operable to transmit signals to and receive signals from the PLMN 7 via one or more antennae 225 and a base station (not shown). As shown, the MTC device 3 also includes a controller 227 which controls the operation of the MTC device 3 and which is connected to the transceiver circuit 223 and to a user interface 229. The controller 227 operates in accordance with software instructions stored within memory 237. As shown, these software instructions include, among other things, an operating system 239, a communication module 241, a timer module 243, a POA/TOA management module 245, and an MTC management module 247.

The communications module 241 manages the reception, transmission, and interpretation of signaling communicated with the network 7. Of particular relevance in the context of the MTC procedures described herein, the communications module 241 manages the receipt of communications broadcast in the cell 13 in which the MTC device 3 resides (for example, in system information or using a cell broadcast service).

The timer module 243 maintains the local timers, including the OffPer timer, for managing location updates. The POA/TOA management module 245 maintains the information defining the POA and the TOA (when defined) and, in particular, manages the initial configuration of, updates to, replacement of, and/or deletion of the POA/TOA information as appropriate. The MTC management module 247 manages the MTC activities of the MTC device 3 including the handling of trigger indications from the MTC server 5 that are broadcast by the network 7.

MTC Server

Figure 3:
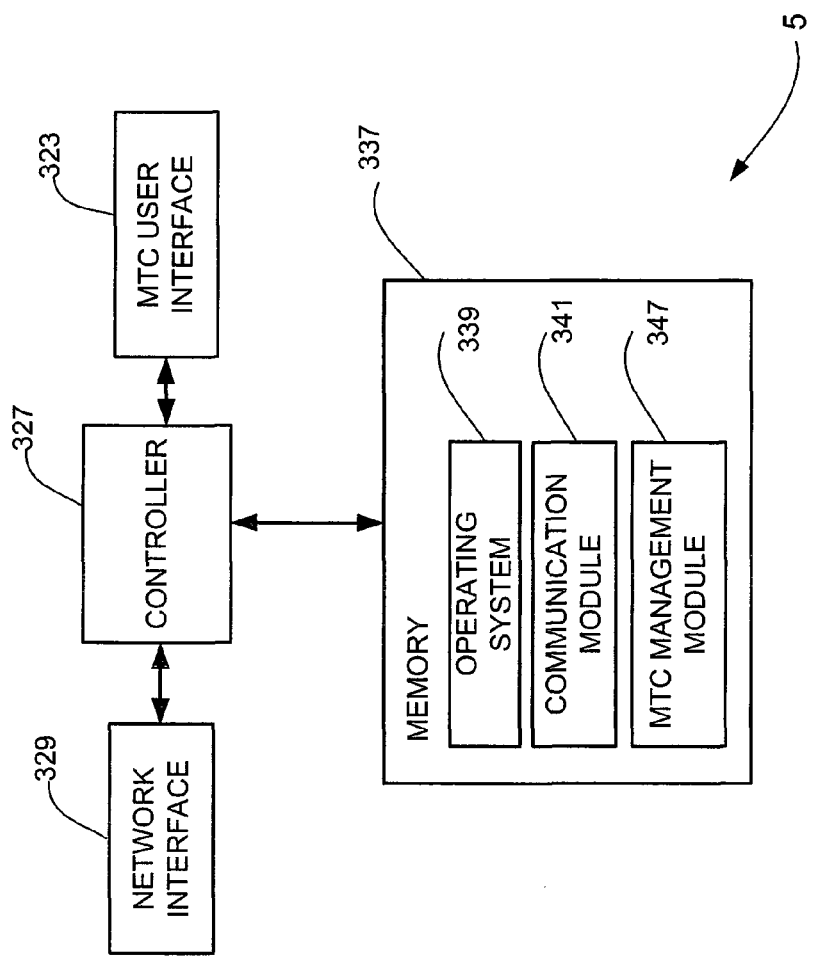
FIG. 3 is a simplified block diagram of an MTC server forming part of the system shown in FIG. 1.

FIG. 3 schematically illustrates the main components of an MTC server 5 of FIG. 1. As shown, the MTC server 5 comprises a network interface 329 via which the MTC server 5 can transmit signals to and receive signals from the PLMN 7. The MTC server 5 also includes a controller 327 which controls the operation of the MTC server 5 and which is connected to an MTC user interface 323 via which the MTC user 9 can access the MTC functions of the MTC server 5. The controller 327 operates in accordance with software instructions stored within memory 337. As shown, these software instructions include, among other things, an operating system 339, a communication module 341 and an MTC management module 347.

The communications module 341 manages the reception, transmission, and interpretation of MTC and other signaling communicated with the network 7 via the network interface 329. The MTC management module 347 manages the MTC functions of the MTC server 5 including the sending of trigger indications to the network 7 for broadcast to an associated MTC device 3 as required.

Network Entity

Figure 4:
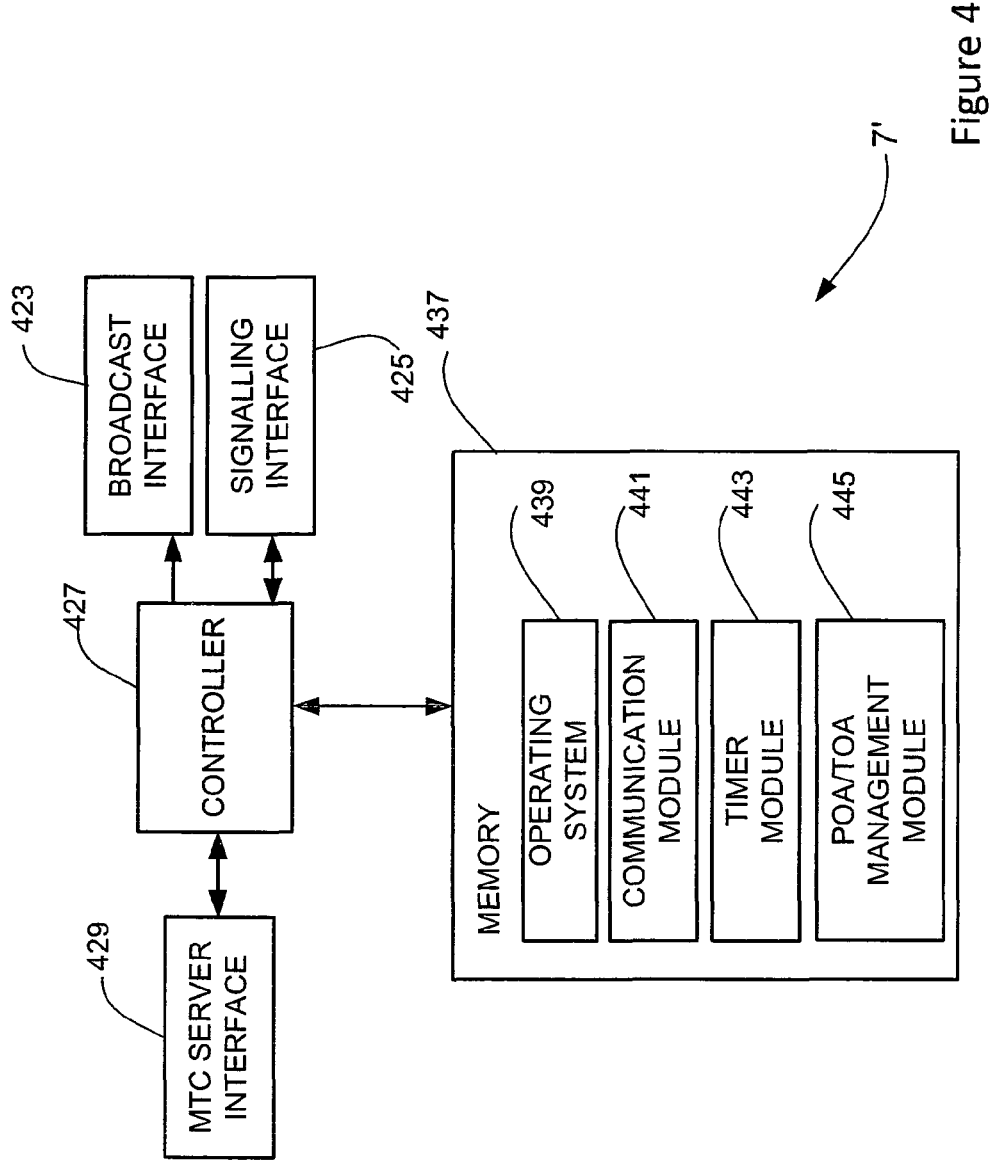
FIG. 4 is a simplified block diagram of a network entity for use in the system shown in FIG. 1.

FIG. 4 schematically illustrates the main components of a network entity 7', operable to form part of the network 7 of FIG. 1 and to support MTC. As shown, the network entity 7' comprises an MTC server interface 429 via which the network entity can receive messages, including MTC trigger indications destined for specific MTC devices 3, from the MTC server 5. The network entity 7' also comprises a broadcast interface 423 via which the network entity 7' can send MTC messages (e.g. MTC trigger indications) for broadcast to specific cells 13, and a signaling interface 425 via which the network entity 7' can send messages (e.g. carrying POA configurations and the value of the OffPer timer) to and receive messages from the MTC device 3.

The network entity 7' also includes a controller 427 which controls the operation of the network entity 7' and which is connected to the interfaces 423, 425, 429. The controller 427 operates in accordance with software instructions stored within memory 437. As shown, these software instructions include, among other things, an operating system 439, a communication module 441, a timer module 443 and a POA/TOA management module 445.

The communications module 441 manages the reception, transmission, and interpretation of MTC and other signaling communicated with the MTC server 5 and MTC devices 3. The timer module 443 maintains timers at the network side, including the OffPer timer and the T online timer, for managing location updates. The POA/TOA management module 445 maintains the information defining the POA 11 and the TOA 15 (when defined) and, in particular, manages the initial configuration of, updates to, replacement of, and/or deletion of the POA/TOA information as appropriate.

Operation

Figure 5:
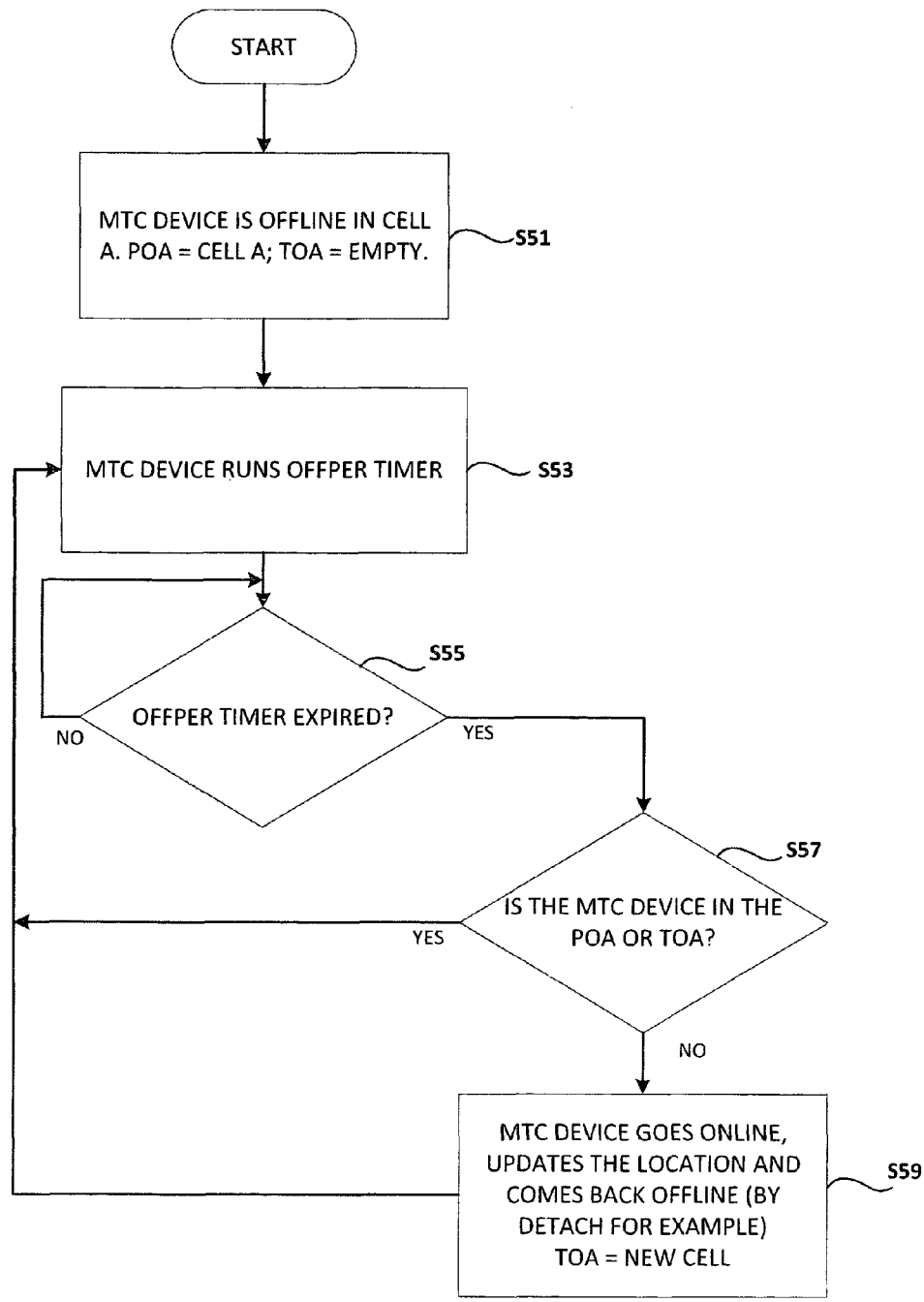
FIG. 5 is a high level flow chart illustrating a procedure implemented by the communication system for supporting machine type communication.

FIG. 5 is a high level flow chart illustrating a procedure implemented by the communication system 1, for supporting machine type communication, by keeping track of the location of offline MTC Devices 3 (or any other offline/detached mobile terminals).

The MTC device 3, to which FIG. 5 relates, is normally off-line and therefore begins the procedure in an off-line state (S51). The MTC device 3 begins in a specific cell 13 (referred to as 'Cell A') which forms part of the Permanent Offline Area (POA) 11 for the MTC device 3. At this stage, the MTC device 3 has not left its POA 11 and, accordingly, the Temporary Offline Area (TOA) is undefined (or 'empty') and so the MTC device 3 is considered, by the network, to be in the POA 3.

Whilst in cell A, the MTC device 3 'listens' for broadcast System Information (SI) and/or the Cell Broadcast Service of cell A and responds to any trigger indications from the MTC server 5 accordingly. The MTC device 3 also runs its Offline Periodic timer (S53), the value of which is delivered by NAS signaling as described previously.

When, at S55, the OfTPer timer expires, the MTC device 3 checks whether it is still in cell A (S57). If the MTC device 3 has moved to a new cell 13 and the new cell 13 does not belong to the POA 11 or a previously defined TOA 15, the MTC device 3 goes online (S59), updates its location and goes offline by itself (for example by using 'detach1 signaling). The new cell 13 now becomes the TOA 15 (in the network 7 and on the MTC device 3) to replace any previous cell 13 in the TOA (in this embodiment).

Thus, advantageously, the location of the MTC device 3 continues to be known by the network 7 to be in the POA 11 or the TOA 15, even though the MTC device 3 is offline and has moved to a previously unexpected cell 13. In this manner, the PLMN 7 can keep a track of the movement/location of the offline MTC devices 3 efficiently thereby making them accessible by the network (e.g. by the MTC server 5) when required.

Operation —Further Embodiment

Figure 6:
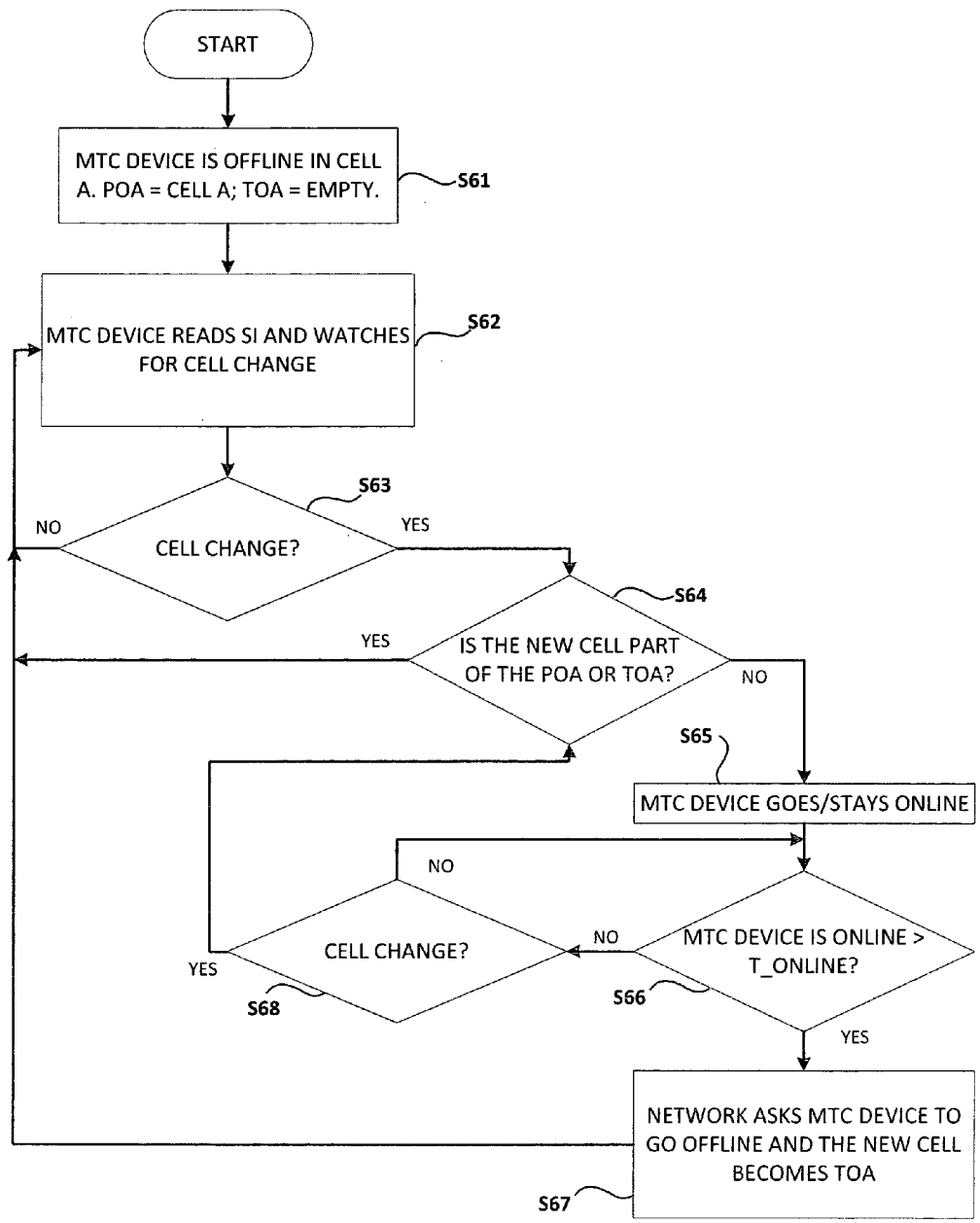
FIG. 6 is a high level flow chart illustrating a further example of a procedure implemented by the communication system for supporting machine type communication.

FIG. 6 is a high level flow chart illustrating another embodiment of a procedure which may be implemented by the communication system 1, for supporting machine type communication, by keeping track of the location of offline MTC devices 3 (or any other offline mobile terminals). The procedure of FIG. 6 has similarities with that shown in FIG. 5 but, advantageously, does not require definition of the new timer (OffPer) albeit at the potential expense of the MTC device 3 having to go online more frequently and potentially the network 7 having to monitor how long the MTC device 3 remains online.

As with the embodiment of FIG. 5, the MTC devices 3, to which FIG. 6 relates are each allocated a respective designated POA 11-1, 11-2, 11-3 (as described previously) comprising at least one cell 13, list of cells 13, Location Area (LA), Routing Area (RA), Tracking Area (TA) and/or combination thereof depending on the type/generation of the network via which the MTC device 3 will connect to the MTC server 5. Similarly, the MTC devices 3 to which FIG. 6 relates may each also have a respective TOA 15 representing a cell 13 (or possibly cells), which does not form part of the POA 11, and from which the MTC device 3 has previously updated its off-line location.

As seen in FIG. 6, the MTC device 3 is normally off-line and therefore begins the procedure in an off-line state (S61). The MTC device 3 begins in a specific cell 13 (referred to as 'Cell A') which forms part of the Permanent Offline Area (POA) 11 for the MTC device 3. At this stage, the MTC device 3 has not left its POA 11 and, accordingly, the Temporary Offline Area (TOA) is undefined (or 'empty') and so the MTC device 3 is considered, by the network, to be in the POA 3.

The MTC device 3 reads the system information broadcast in the cell 13 in which it is located and monitors the identity of the cell 13 in which it is located (S62). When the MTC device 3 moves and its cell 13 changes, the MTC device 3 detects the change (S63) and responds by checking whether the new cell 13 is part of the POA 11 or TOA 15 (if defined) at S64. If the new cell 13 is not part of the POA 11 or TOA 15 (if defined), the MTC device 3 goes online (at S65), attaches to the network 7 and operates as an attached (online) MTC device 3.

Whilst online, the MTC device 3 performs location update, and periodic updates as normal (e.g. maintaining full mobility functionality).

If, at S66, the MTC device 3 stays in the new cell 13 (without reselection to a new cell 13 at S68) for a time longer than (or equal to) a predefined period of time (possibly based on, and defined by, a predetermined number of periodic updates) (T_online), then the network 7 requests the MTC device 3 to go offline at S67. When this occurs, the new cell 13 replaces any ceil 13 currently identified as the TOA 15 (i.e. the old TOA value, if any, is deleted).

If the MTC device 3 moves to a new cell 13 (e.g. detected at S68) then the MTC device responds by checking whether the new cell 13 is part of the POA 11 or TOA 15 (if defined) at S64 and continues with steps S65 to S67/S68 as described previously.

Thus, advantageously, the location of the MTC device 3 continues to be known by the network 7 to be in the POA 11 or the TOA 15, even though the MTC device 3 is offline and has moved to a previously unexpected cell 13. In this manner, the PLMN 7 can keep a track of the movement/location of the offline MTC devices 3 efficiently thereby making them accessible by the network (e.g. by the MTC server 5) when required.

Modifications and Alternatives

A number of detailed embodiments and variations have been described above. As those skilled in the art will appreciate, a number of modifications and alternatives can be made to the above embodiments and variations whilst still benefiting from the inventions embodied therein.

For example, whilst a number of different embodiments employing different approaches are described separately, any aspect of the functionality they represent may be provided for in combination with or as an alternative to the functionality represented by a different approach. In particular, it will be appreciated that a choice of approach may be provided in the UE for a user (or provider) to configure the device to use any of the different approaches, or a particular aspect of an approach, independently.

It will be appreciated that the TOA 15 for a particular MTC device 3 may comprise a maximum of one cell 13 (e.g. the non-POA cell 13 from which the most recent off-line location update was sent) or may comprise a plurality of such cells 13 (e.g. the last non-POA cell 13 from which the most recent off-line location update was sent plus the neighbor cells).

It will be appreciated that the length of the period represented by the OffPer Timer may be notified to the MTC device (and/or updated) using any appropriate NAS signaling, for example during the attach procedure and/or Location updating/Routing Area Update or Tracking Area Update procedures (e.g. in an ATTACH ACCEPT message, or in LOCATION UPDATING ACCEPT/ROUTING AREA UPDATE ACCEPT/TRACKING AREA UPDATE ACCEPT messages). The period represented by the OffPer Timer may, alternatively or additionally, be notified via the Open Mobile Alliance (OMA) Data Management (DM) configuration and/or Subscriber Identity Module/Universal Subscriber Identity Module (SIM/USIM) over-the-air (OTA) configuration. It also could be delivered in a System Information broadcast.

It will be appreciated that the information identifying the POA 11 could be provided in signaling (e.g. NAS signaling) from the MTC server 5 in addition to or as an alternative to providing the information as part of the subscription information. For example, the POA could be provided or updated in the MTC device 3 in NAS signals like ATTACH ACCEPT and or LOCATION UPDATING ACCEPT/ROUTING AREA UPDATE ACCEPT/TRACKING AREA UPDATE ACCEPT messages. Alternatively, the POA could be provided using the Open Mobile Alliance Device Management protocol (OMA DM) or Over the Air configuration (OTA).

It will also be appreciated that the network may build a TOA 15 from a plurality of cells 13 and not just from the most recent non-POA cell 13 from which an off-line location update has been sent. The TOA 15 may comprise, for example: a list of previously visited cells 13; a list including the most recent non-POA cell 13 from which an off-line location update has been sent and cells 13 neighboring it; a whole LA, RA or TA, or any combination thereof. In this scenario, the network 7 is adapted to update the MTC device 3 with this newly built TOA 15. Further, the network 7 could potentially, in certain circumstances, determine to add the newly defined TOA 15 to the POA 11, effectively expanding (or updating) the POA 11. The network 7 could update the MTC device 3 with the modified POA 11, and could then delete the TOA 15 in the network and the MTC device 3. For example, if the MTC device 3 has spent a particularly long time away from the cells 13 of the original POA 11, instead remaining in a TOA 15, the network 7 may determine to update the POA 11 to reflect this. An MTC user 9 could also potentially trigger such a change.

It will be appreciated that the network entity 7' has been described, for illustrative purposes, as a single physical entity. The network entity 7' may however, comprise a logical or a physical entity. Moreover, the functionality of the network entity 7' may be split between a plurality of logical/physical entities. It will be appreciated that the signals/broadcasts the network entity 7' transmits/receives may be sent/received indirectly via other network entities In the above embodiment, a mobile (cellular) type telecommunications system was described. As those skilled in the art will appreciate, the techniques described in the present application can be employed in other communications system. Other communications nodes or devices may include user devices such as, for example, personal digital assistants, laptop computers, web browsers, mobile telephones, sensors, meters, vending machines etc.

In the embodiment described above, the MTC device 3 is described as having transceiver circuitry. Typically, this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to any of the various entities described as a signal over a computer network, or on a recording medium. Further, the functionality performed by part or all of this software may be performed using one or more dedicated hardware circuits. However, the use of software modules is preferred as it facilitates the updating of the various entities in order to update their functionalities.

Various other modifications will be apparent to those skilled in the art and will not be described in further detail here.

The invention claimed is:

1. A communication device for supporting machine type communication within a cellular communication network, the communication device comprising:
    a memory configured to store expected location information representing at least one area in which the communication device is expected to remain located whilst in an offline state in which the communication device is detached from the network; and
    a location manager configured to identify a cell in which the communication device is currently located;
    wherein the location manager is configured to determine, while the communication device is in the offline state in which the communication device detached from the network, from said expected location information, whether or not said cell forms at least part of said at least one area, and
    wherein when said at least one area is determined, by the location manager while the communication device is in the offline state in which the communication device is detached from the network, not to comprise the cell in which the communication device is currently located, the communication device is configured to move from the offline state to an online state by attaching to the network in response to said determination, and communicate information identifying the cell in which the communication device is currently located to the network.

2. A communication device as claimed in claim 1 wherein the expected location information represents:
    a first, predefined, area comprising at least one cell in which the communication device is expected to remain located whilst in the offline state in which the communication device is detached from the network; and
    a second, dynamically defined, area comprising at least one further cell.

3. A communication device as claimed in claim 2 wherein the second area comprises at least one cell for which said communication device has previously communicated cell identification information in response to a determination that said at least one area does not comprise that cell.

4. A communication device as claimed in claim 2 wherein if said at least one area is determined, by the location manager, not to comprise the cell in which the communication device is currently located, the communication device is further configured to update said information representing said second area to comprise said cell in which the communication device is currently located.

5. A communication device as claimed in claim 4 wherein, the communication device is configured to update said information representing said second area by replacing another cell forming at least part of said second area with said cell in which the communication device is currently located.

6. A communication device as claimed in claim 2 wherein said second area comprises a single cell.

7. A communication device as claimed in claim 4 wherein the communication device is configured to update said information representing said second area by replacing it with said cell in which the communication device is currently located or by adding said cell to at least one cell already forming at least part of said second area.

8. A communication device as claimed in claim 2 wherein the communication device is further configured to update said information representing said second area based on information received from said communication network.

9. A communication device as claimed in claim 8 wherein the information received from said communication network comprises information identifying at least one of the following:
    a cell neighbouring the cell in which the communication device is currently located;
    a local area (LA) associated with the cell in which the communication device is currently located or at least one cell thereof;
    a routing area (RA) associated with the cell in which the communication device is currently located or at least one cell thereof; and/or a tracking area (TA) associated with the cell in which the communication device is currently located or at least one cell thereof.

10. A communication device as claimed in claim 1, further comprising:
    a communication manager configured to receive, whilst detached from said communication network, a trigger message for triggering said communication device to initiate communications with a further communication device;
    wherein the communication manager is configured to respond to receipt of said trigger message by initiating said communications.

11. A communication device as claimed in claim 1, wherein said location manager is configured to determine whether or not said at least one area comprises a cell in which the communication device is currently located after expiry of a predefined time period.

12. A communication device as claimed claim 11, wherein said predefined time period is monitored by a timer or counter on the communication device.

13. A communication device as claimed in claim 1, wherein the communication device is configured to detach from said network automatically after communicating, to the network, said information identifying the cell in which the communication device is currently located.

14. A communication device as claimed in claim 1 wherein said location manager is configured to identify a change of cell in which the communication device is currently located, and wherein the location manager is configured to determine whether or not said at least one area comprises the cell in which the communication device is currently located on identifying a change of cell in which the communication device is currently located.

15. A communication device as claimed in claim 1 wherein the communication device is configured to detach from said communication network on receipt of a message from said communication network indicating that said detach should take place.

16. A communication device as claimed in claim 15 wherein the message from said communication network is received after a predefined time period.

17. A communication device as claimed in claim 16 wherein the predefined time period is represented as a predefined number of periodic updates.

18. A method performed by a communication device of supporting machine type communication within a cellular communication network, the method comprising:
   storing expected location information representing at least one area in which the communication device is expected to remain located whilst in an offline state in which the communication device is detached from the network;
   identifying a cell in which the communication device is currently located; and
   determining while the communication device is in the offline state in which the communication device is detached from the network, from said expected location information, whether or not said cell forms at least part of said at least one area, wherein when said at least one area is determined not to comprise the cell in which the communication device is currently located while the communication device is in the offline state in which the communication device is detached from the network, said method comprises moving from the offline state to an online state by attaching to the network in response to said determination, and communicating information identifying the cell in which the communication device is currently located to the network.

19. A network entity for supporting machine type communication by a communication device within a cellular communication network, the network entity comprising:
   a server interface configured to receive a message for said communication device from a server;
   a location manager configured to identify at least one area comprising at least one cell in which said communication device is expected to remain located whilst in an offline state in which the communication device is detached from the network; and
   a broadcast interface configured to broadcast said message in each cell of said at least one area so identified.

20. A network entity for supporting machine type communication by a communication device within a cellular communication network, the network entity comprising:
   a memory configured to store expected location information representing at least one area in which said communication device is expected to remain located whilst in an offline state in which the communication device is detached from the network;
   a signal interface configured to receive, from a communication device in an online state, information identifying a cell in which the communication device is currently located, which cell does not form part of said at least one area; and
   an area manager configured to update said stored information identifying the at least one area, based on said information received from the communication device, to include the cell in which the communication device is currently located.

21. A network entity as claimed in claim 19 wherein said at least one area comprises:
   a first, predefined, area comprising at least one cell in which the communication device is expected to remain located whilst in the offline state in which the communication device is detached from the network; and
   a second, dynamically defined, area comprising at least one further cell.

22. A network entity as claimed in claim 21 wherein the second area comprises at least one cell for which said communication device has previously communicated cell identification information in response to a determination that said at least one area does not comprise that cell.

23. A network entity as claimed in claim 21, wherein the area manager is configured to update said information representing said second area to comprise said cell in which the communication device is currently located.

24. A network entity as claimed in claim 23 wherein, the area manager is configured to update said information representing said second area by replacing another cell forming at least part of said second area with said cell in which the communication device is currently located.

25. A network entity as claimed in claim 21 wherein said second area comprises a single cell.

26. A network entity as claimed in claim 23 wherein the area manager is configured to update said information representing said second area by adding said cell in which the communication device is currently located, to at least one cell already forming at least part of said second area.

27. A network entity as claimed in claim 23 wherein the network entity is configured to initiate detachment of said communication device from said communication network after expiry of a predefined time period for staying on-line.

28. A network entity as claimed in claim 27, wherein detachment of said communication device from said communication network is initiated by transmission of a message to said communication device to indicate that said detach should take place.

29. A network entity as claimed in claim 23 wherein the network entity is configured, in response to receiving said information from said communication device, to allocate at least one further cell to said second area in addition to said cell in which the communication device is currently located, and to notify said communication device of each allocated cell.

30. A network entity as claimed in claim 29 wherein the network entity is configured, when allocating said at least one further cell, to allocate:
   a cell neighboring the cell in which the communication device is currently located;
   a local area (LA) associated with the cell in which the communication device is currently located or at least one cell thereof; a routing area (RA) associated with the cell in which the communication device is currently located or at least one cell thereof; and/or
   a tracking area (TA) associated with the cell in which the communication device is currently located or at least one cell thereof.

31. A method performed by a network entity for supporting machine type communication by a communication device within a cellular communication network, the method comprising:
   receiving a message for said communication device from a server;
   identifying at least one area comprising at least one cell in which said communication device is expected to remain located whilst in an offline state in which the communication device is detached from the network; and
   broadcasting said message in each cell of said at least one area so identified.

32. A method performed by a network entity for supporting machine type communication by a communication device within a cellular communication network, the method comprising:

storing expected location information representing at least one area in which said communication device is expected to remain located whilst in an offline state in which the communication device is detached from the network;

receiving, from a communication device in an online state, information identifying a cell in which the communication device is currently located, which cell does not form part of said at least one area; and updating said stored information identifying the at least one area, based on said information received from the communication device, to include the cell in which the communication device is currently located.

33. A non-transitory computer readable medium comprising instructions configured to program a programmable processor to perform a method comprising:

storing expected location information representing at least one area in which a communication device is expected to remain located whilst in an offline state in which the communication device is detached from the network;

identifying a cell in which the communication device is currently located; and determining while the communication device is in the offline state in which the communication device is detached from the network, from said expected location information, whether or not said cell forms at least part of said at least one area, wherein when said at least one area is determined not to comprise the cell in which the communication device is currently located while the communication device is in the offline state in which the communication device is detached from the network, said method comprises moving from the offline state to an online state by attaching to the network in response to said determination, and communicating information identifying the cell in which the communication device is currently located to the network.

* * * * *